UNITED STATES PATENT OFFICE.

PAUL JOSEPH ALOYS SCHOLZ, OF DRESDEN, GERMANY, ASSIGNOR TO THE FIRM OF ADOLPH RENNER, OF DRESDEN, GERMANY.

METHOD OF MAKING RELIEVO-FORMES FOR PRINTING.

1,167,939. Specification of Letters Patent. Patented Jan. 11, 1916.

No Drawing. Application filed March 10, 1915. Serial No. 13,503.

*To all whom it may concern:*

Be it known that I, PAUL JOSEPH ALOYS SCHOLZ, a subject of the German Emperor, and a resident of 11 Bauhofstrasse, Dresden-A., Saxony, Germany, have invented certain new and useful Improvements in Methods of Making Relievo-Formes for Printing, of which the following is a statement.

According to the present invention it is rendered possible to produce by purely graphical means,—by mere drawing, painting, printing—and directly—without need of any photo-mechanical process, without etching and the like—plastic printing formes, that is to say relievo formes, which may be used as matrices for making stereotype plates, may be reinforced by galvanoplastic process or may be thereby copied, or which may also be employed, directly as they are, for printing.

The invention is based upon the observation that various materials, or mixtures of materials, which can be applied in the same manner as ink or paint with a pen, drawing pen, brush, or also any known printing method, and which, when dry, do not leave any measurable, or at least only a very thin film on the paper, will swell in a peculiar manner, and sufficiently for producing the required relievo, when a matrix board or any other suitable material, to which such material or mixture of materials has been applied in the form of writing, painting or printing is covered with the hot type-metal. It has been found that very different substances, such as common waterglass, or gum arabic dissolved or mixed with water may be thus employed. Also other substances than those named may be more or less advantageously employed for the purpose. So it was found that a particularly well adapted mixture was the following: 9 parts of (dry) gum arabic, 1 part of common, commercial waterglass, 1 part of the known commercial autographic ink, 1 part of a 5% solution of shellac in spirits, 1 part of Venetian soap (dry) and a small quantity of any coloring matter soluble in water. These ingredients are mixed with water to such an extent, that a fluid is obtained which will flow well from the pen or brush. The addition of coloring matter is intended to facilitate the drawing, as it will render the lines drawn or surfaces coated better visible; it is, therefore, also dispensable.

The hereinbefore specified mixture I have, according to my experiences, found to be the best suited for the purpose, but I do not mean to limit my invention to this formula only. On the contrary I consider it within the scope of my invention if, in place of the said mixture waterglass alone, or gum arabic with the additions stated, or also any other suitable material or any other suitable mixture of materials is employed. It is only essential, that the material or the mixture of materials employed, is of such a nature, that it may be applied the same as ink or thin paint by writing, drawing, painting or printing, and that when so applied it does not leave any residue which is sufficient to produce the relievo of the forme, but will swell under action of heat and thereby form a relief which is sufficiently high, dense and strong to produce the relievo forme. I am unable to give a theoretical explanation of such swelling. The same may be the result of a decomposition of the solution by the action of the heat, it may also result from a rapid evaporation of the moisture caused by the sudden heating, thus from a process analogous to the baking of an unleavened dough. Possibly there is also a coaction of both these causes. At all events, the surface so coated and heated is blistered or raised above the surface not so coated. It is obvious that the blistering must not be too large. It may be assumed that the counter-pressure of the molten metal will tend toward the forming of a dense, finely porous and clearly defined relief. However, it is also possible to obtain with the above specified mixture a good result by merely heating it, for example in an empty hot stereotype-forme, without pouring any molten metal on it. Using the term "developing" for the heating of the matrix board or any backing employed on which the solution has been applied, such heating producing the raised relief, such developing may be simultaneous with the production of the stereotype cast, by the molten type metal being poured directly onto the undeveloped form; the latter may, however, also be first developed by merely heating it, without pouring the type metal on it, and the cast may then be made subsequently. The forme thus obtained by either method will allow of quite a number of stereotype casts being made. It is thus possible, by the present invention, to obtain from the purely graphical model, of the artist, or which may be easily obtained by mere printing from existing formes, a plastic cast directly.

By grinding the surface of the relief portions the developed forme may also be made serviceable as a printing forme. In such case it is advisable to increase the strength of the part in relief by coating it with waterglass or the like. When the developed forme is to be used directly for printing, the positive process, black on white, is employed in applying the solution, if the print is to be likewise a positive one. The same is the case with copies made of the developed forme by galvanic process. When, however, stereotype casts are to be made for positive printing, the solution must be applied according to the negative process. A second shade may be obtained, for example by applying the solution to a screened or otherwise prepared matrix board, or also by marking parts, which shall not be as raised as others, with a solution, which will not swell as much as that used for the other parts. It is advisable to strongly calender the matrix board to be used before applying the ink, so as to insure a clear definition of the design, and, afterward, in printing a uniform, even color.

I claim:

1. A method of making a form for use in the art of printing which comprises applying to a plain surface over the portions thereof designed to be in relief a solution expansible under heat, and subjecting said plain surface to a heating action which causes said portions to become swollen and set forming the desired rilievo.

2. A method of making a form for use in the art of printing which comprises applying to a plain surface over the portions thereof designed to be in relief a colored solution expansible under heat, and subjecting said plain surface to a heating action which causes said portions to become swollen and set forming the desired rilievo.

3. A method of making a form for use in the art of printing which comprises applying to a matrix board over the portions thereof in ultimate relief a solution expansible under heat, and casting a stereotype form in contact with said matrix, the heat of the casting developing said portions into the desired rilievo and the so-developed portions serving to mold the casting.

4. A method of making a form for use in the art of printing which comprises applying to a matrix board over the portions thereof in ultimate relief solutions having different degrees of expansion under heat, and casting a stereotype form in contact with said matrix, the heat of the casting developing said portions into the desired rilievo and the so-developed portions serving to mold the casting.

5. A method of making a form for use in the art of printing which comprises applying to a plain surface over the portions thereof designed to be in relief a solution expansible under heat containing gum-arabic, autographic ink, shellac and soap, and subjecting said plain surface to a heating action which causes said portions to become swollen and set forming the desired rilievo.

6. A method of making a form for use in the art of printing which comprises applying to a matrix board over the portions thereof in ultimate relief a solution expansible under heat and containing gum-arabic, autographic ink, soluble glass, shellac and soap, and casting a stereotype form in contact with said matrix, the heat of the casting developing said portions into the desired rilievo and the so-developed portions serving to mold the casting.

7. A method of making a form for use in the art of printing which comprises applying to a matrix board over the portions thereof in ultimate relief a solution expansible under heat and containing gum-arabic, ink, soluble glass, shellac, soap and a dye, and casting a stereotype form in contact with said matrix, the heat of the casting developing said portions into the desired rilievo and the so-developed portions serving to mold the casting.

In testimony whereof I have hereunto set my hand in the presence of two subscribing witnesses.

PAUL JOSEPH ALOYS SCHOLZ.

Witnesses:
  OTTO WOLFF,
  C. F. HUGO BAMMER.